(12) United States Patent
Liebl

(10) Patent No.: US 10,291,383 B2
(45) Date of Patent: May 14, 2019

(54) COMMUNICATION DEVICE AND METHOD FOR WIRELESS SIGNAL TRANSMISSION

(71) Applicant: Rohde & Schwarz GmbH & Co. KG, Munich (DE)

(72) Inventor: Detlev Liebl, Fuerstenfeldbruck (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 57 days.

(21) Appl. No.: 14/686,949

(22) Filed: Apr. 15, 2015

(65) Prior Publication Data

US 2016/0308661 A1    Oct. 20, 2016

(51) Int. Cl.
*H04L 5/14*    (2006.01)
*H04B 1/48*    (2006.01)
*H04B 1/04*    (2006.01)
*H04L 27/00*    (2006.01)

(52) U.S. Cl.
CPC ......... *H04L 5/1461* (2013.01); *H04B 1/0458* (2013.01); *H04B 1/48* (2013.01); *H04L 27/0014* (2013.01)

(58) Field of Classification Search
CPC .................................................... H04L 5/1461
See application file for complete search history.

(56) References Cited

U.S. PATENT DOCUMENTS

| | | | |
|---|---|---|---|
| 7,864,120 B2 | 1/2011 | Dou et al. | |
| 2002/0140616 A1* | 10/2002 | Kanamaluru | H01Q 25/00 343/756 |
| 2008/0045152 A1* | 2/2008 | Boes | H04W 16/14 455/63.1 |
| 2011/0183624 A1* | 7/2011 | V | H01P 1/184 455/63.4 |
| 2013/0102254 A1* | 4/2013 | Cyzs | H04B 1/126 455/63.1 |
| 2013/0225099 A1* | 8/2013 | Vosburgh | H04B 1/525 455/78 |
| 2013/0265120 A1 | 10/2013 | Park et al. | |
| 2013/0278458 A1* | 10/2013 | Mitsugi | G01S 7/2921 342/202 |
| 2014/0050124 A1 | 2/2014 | Yang et al. | |
| 2014/0187276 A1 | 7/2014 | Cyzs et al. | |
| 2014/0198688 A1 | 7/2014 | Li et al. | |
| 2014/0269534 A1 | 9/2014 | Persson et al. | |
| 2014/0287794 A1* | 9/2014 | Akhi | H01Q 21/006 455/550.1 |
| 2016/0156381 A1* | 6/2016 | Rydstrom | H04B 1/525 370/286 |

FOREIGN PATENT DOCUMENTS

WO    WO2014100180 A1    6/2014

* cited by examiner

*Primary Examiner* — Jason E Mattis

(74) *Attorney, Agent, or Firm* — Lee & Hayes, P.C.

(57) ABSTRACT

The invention is related to a communication device and a method for wireless signal transmission. An interference reduction means is arranged in between a transmitting path and a receiving path. The interference reduction mean is a wideband interference reduction means which converts a signal from said transmitting path into an anti-phased signal to provide the anti-phased signal to said receiving path.

18 Claims, 6 Drawing Sheets

COMMUNICATION DEVICE AND METHOD FOR WIRELESS SIGNAL TRANSMISSION

FIELD OF THE INVENTION

The invention is related to a communication device and a method for wireless signal transmission.

Nowadays communication devices comprise means for wireless signal transmission to communicate information, such as data or speech, from one communication device to another communication device, wherein the communication devices are distantly arranged to each other.

Therefore, the communication device comprises a transmitting path to transmit signals via an antenna wirelessly to the other communication device. For receiving signals from the other communication device the communication devices further comprise a receiving path. To achieve a full duplex transmission mode it is necessary that the transmitting path and the receiving path do not influence each other in a way that either the transmitting path is blocked by the receiving path or vice versa. Thus, there is a need for interference cancellation means between a transmitting path and a receiving path in a communication device.

BACKGROUND OF THE INVENTION

Existing solutions attempt to solve this problems by avoiding the interference, for instance in time, frequency and power domains. Moreover, existing solutions are highly specific to one particular interference constellation and therefore require different solutions for different interference constellations.

In document WO 2014/100180 A1 an interference cancellation method for multi-radio mobile devices is described. Here interference cancellation in a communication device having a plurality of transceivers includes a detecting of co-existence issue between a first transceiver and a second transceiver, determining parameters of the co-existence issues and selecting the first transceiver for providing an input signal to an interference cancellation circuit. A second transceiver is used to receive an output of the interference cancellation circuit in dependence on the adjusted parameters.

Such an effort is highly scenario dependent and the interference cancellation is very complex. Each constellation needs to be determined. Additionally, parameters for a cancellation of the interference need to be calculated and adjusted in the cancellation circuit. Furthermore, the adjusted signal needs specifically be applied to the specific output transceiver. Thus, a complex computing and adjusting is necessary, which is time-consuming and cost efficient. This solution is not flexible for different interference scenarios.

Thus, there is a need for providing a low cost interference cancellation in a communication device which is useful in a wide range of application scenarios and which can flexibly be used in different communication devices.

SUMMARY OF THE INVENTION

According to a first aspect of the invention in a communication device for wireless signal transmission an interference reduction means is arranged in between a transmitting path and a receiving path. The interference reduction means is a wideband interference reduction means which converts a signal from said transmitting path into an anti-phased signal to provide the anti-phased signal to said receiving path.

Using a wideband interference reduction means leads to a frequency independent coupling of signals of the transmitting path to the receiving path and thus a symmetrical anti-phased coupling is achieved. This anti-phased coupling leads to a compensation of unwanted signal parts in time domain. Since the interference reduction means is a wideband reduction of interferences, it works for a wide range of signal transmission applications. The provision of the anti-phased signal to the receiving path leads to a subtraction of unwanted signal parts in the receiving part and thus to a compensation of interferences. Additionally it is avoided to obtain mixed products in the frequency band of unwanted signals in a receiving path. Such mixing products would lead to the inability of receiving signals during transmission of signals and would avoid a desired full-duplex transmission mode.

The term "wideband" preferably means that a transmission bandwidth significantly exceeds the coherence bandwidth of the channel. Some communication links have such a high data rate that they are forced to use a wide bandwidth. A wideband antenna is one with approximately or exactly the same operating characteristics over a very wide passband. The wideband range according to the invention preferably is from DC to at least 20 Gigahertz.

The anti-phased signal from the interference reduction means is a static signal and therefore achieved in a very simple manner.

In a preferred embodiment the communication device comprises at least a transceiver, wherein said transceiver comprises said transmitting path and said receiving path and wherein said transceiver further comprises a common antenna for wireless signal transmission to external devices. Thus, the transmitting path is in close vicinity to the receiving path which automatically leads to interferences between transmitting and receiving of signals in the communication device.

Especially a first node of the interference reduction means is connected to a signal line between the antenna and a transmission path amplifying means in the transmitting path. Especially a second node of the interference reduction means is directly connected to a signal line between the antenna and a receiving amplifying means of the transceiver. Thus, the transmission signals, which would disturb the signals in the receiving path of the transceiver, are subtracted in time domain.

In a more preferred embodiment the communication device comprises a plurality of transceivers in a common housing of the communication device. Thereby said transmitting path is a transmitting path of a first transceiver and said receiving path is a receiving path of the second transceiver. Additionally said transmitting path can also be a transmitting path of the second transceiver and said receiving path can be a receiving path of the first transceiver.

The plurality of transceivers increase the functionality of the communication device. The plurality of transceivers are capable to communicate using different protocols having overlapping or nearby frequency channels. The transceivers may influence each other in a way that disturbs parallel communications over different transceivers.

Preferably, certain mobile communication devices include both, a wireless local area network, short W-LAN, transceiver which operates at a frequency between 2.4 Gigahertz and 2.5 Gigahertz, furthermore, a Bluetooth® transceiver operating at a frequency between 2.4 Gigahertz and 2.5 Gigahertz. That may lead to co-existence issues due to the overlap of frequencies of the different transceivers. In another example, a W-LAN transceiver operating at the frequency between 2.4 Gigahertz and 2.5 Gigahertz can interfere with a wireless wide area network, short WWAN, transceiver transmitting information according to the Long Term Evolution standard, short LTE, that utilizes 2.5 Gigahertz to 2.57 Gigahertz for uplink and 2.62 Gigahertz to 2.69 Gigahertz for downlink communication. Further transceivers, such as near-field-communication transceivers or radio-frequency-identification transceivers can also be used.

The use of the interference reduction means leads to a symmetrical coupling of transmission signals to the appropriate receiving path.

The communication device is preferably a mobile or satellite communication device, such as a smart phone or appropriate communication devices which comprises the plurality of transceivers in a common housing. Thus, the appropriate antennas or wireless transmission of signals are arranged in close vicinity. This proximity between the antennas lead to an interference of a signal of the first antenna to a signal of a second antenna. Thus, during transmission of signals via a first transceiver a receiving path of a second transceiver might be blocked. To avoid such interferences the inventive interference reduction means are used to subtract those interferences on the receiving path in a broadband manner.

The communication device can further be any kind of radio equipment. Radio equipment is any equipment or interconnected system or subsystem of equipment (both transmission and reception) that is used to communicate over a distance by modulating and radiating electromagnetic waves in space without artificial guide.

Preferably, the interference reduction means is capable of working bidirectional. Therefore the interference reduction means is arranged between an antenna path of a first transceiver and an antenna path of a second transceiver. Thus, when transmitting signals via a transmitting path of the first transceiver, the receiving path of the second transceiver is not interfered. Also, when transmitting signals via a transmitting path of the second transceiver, the receiving path of the first transceiver is not interfered without rearrangement of the interference reduction means. The first transceiver is preferably an LTE-transceiver. The second transceiver is preferably a Bluetooth®- or a WLAN-transceiver.

In a preferred embodiment the interference reduction means comprises an attenuation module, preferably an adaptive attenuation module. Thus, the amplitude of the anti-phased feedback signal can be adjusted and equalized the radio frequency antenna isolation. Thus, the transmitting path and the receiving path modules can be left unchanged and only the antenna measurements and arrangements are adapted once. Since the interference reduction means is a wideband interference reduction means, no specific further processing means for adaption and detection of the interference signals are needed.

In a preferred embodiment a propagation delay of the interference reduction means is equal to the propagation delay between the transmitting path and the receiving path. Since the converted signal is anti-phased to the transmission signal the provisioning of this anti-phase signal leads to a complete compensation of the interfering signal.

The realization of the interference reduction means 4 can be used for symmetrical and asymmetrical antenna feeding. Instead of using electrical feeding a magnetic feeding is also possible.

In a preferred embodiment the interference reduction means comprises a transformer, wherein the winding direction of a first winding is opposite to the winding direction of a second winding. The opposite winding direction can be obtained by winding the second winding in opposite direction to the winding direction of the first winding. Alternatively, the second winding contact pins are used in opposite manner to obtain the opposite winding direction.

The opposite winding direction leads to a 180 degree phase inversion and thus to a subtraction of the interference signal in the receiving path.

In case the first winding and the second winding are equally designed, the generated anti-phased signal comprises an amplitude which is approximately equal to the amplitude of the interfering signal. The anti-phased signal thus compensates the interfered signal.

Preferably, the transformer can be built with lossy components in order to adapt the attenuation of the transformer. In such a case the attenuation means can be avoided and the amplitude of the anti-phased signal is adapted easily.

In a preferred embodiment the interference reduction means comprises at least an inverting amplifier means, especially an inverting operational amplifier. An inverting amplifier inverts the phase. Thus, the anti-phased signal is obtained easily and can be used to compensate the interference signal in the receiving path.

In a more preferred embodiment the interference reduction means comprises a micro strip arrangement. Such micro strip arrangements are normally used to provide a connection between the amplifier means for transmission and receiving of signals to the antennas. Thus, those micro strip arrangements are adapted and now additionally comprise the interference reduction means. Such a micro strip arrangement can be easily manufactured and are thus cost efficient.

In a preferred embodiment the micro strip arrangement comprises a resistance element to adjust the attenuation of the micro strip arrangement to match the amplitude of the interference signal to the anti-phased signal for compensating the interference signal.

In case the interference reduction means comprises a micro strip arrangement, it is advantageous that the antennas and the interference reduction means are built on a common substrate.

In a more preferred embodiment the micro strip arrangement comprises a defected ground structure in its signal path. Thus, a wideband phase shifting of 180 degree is obtained in an easy manner.

In a more preferred embodiment the interference reduction means comprises a frequency adjusting means in order to limit the wideband property of the interference reduction means to a specific passband.

In a more preferred embodiment a combining element is used to combine said transmission path and said receiving path in the transceiver.

According to another aspect of the invention, a method for wireless signal transmission with a communication device is described. The method comprises the steps of: Providing a signal to a transmission path of said communication device; converting the signal into an anti-phased signal by means of an interference reduction means, wherein the interference reduction means is a wideband interference reduction means; and providing the anti-phased signal to a receiving path of the communication device.

In a preferred embodiment of the method the signal is provided by a first transceiver of the communication device wherein the said transmitting path is part of the first transceiver and wherein said receiving path is part of a second transceiver arranged in a common housing of the communication device.

BRIEF DESCRIPTION OF THE DRAWINGS

In the following exemplary embodiments of the invention are described with reference to drawings. Those exemplary embodiments do not limit the scope of the invention. The same reference signs in different drawings indicate the same elements or at least the same functions unless otherwise stated.

DETAILED DESCRIPTION OF THE PREFERRED EMBODIMENTS

Figure 1A:
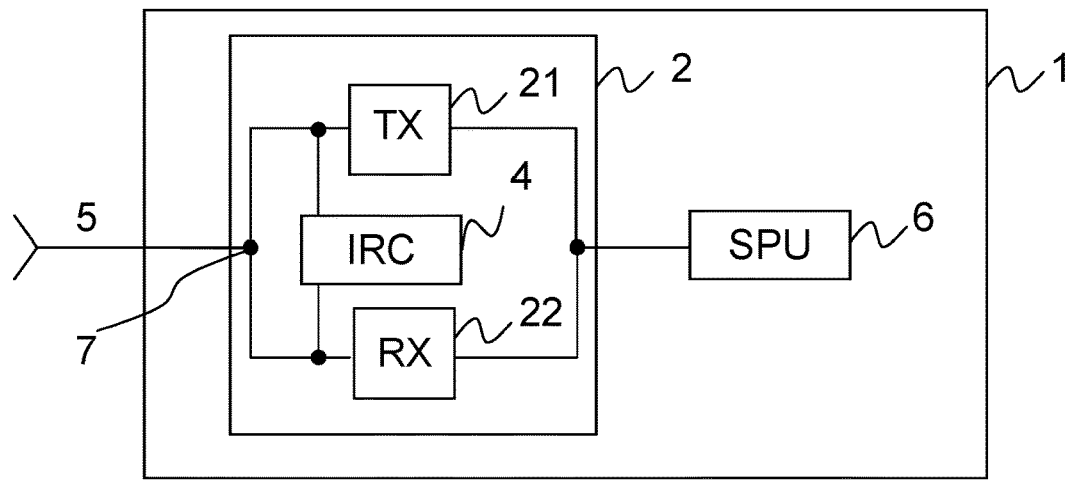
FIG. 1a shows a first exemplary embodiment of a communication device according to the invention.

FIG. 1a shows a first exemplary embodiment of a communication device 1 according to the invention. The communication device 1 comprises a transceiver 2 and a signal processing unit 6. The signal processing unit 6 is configured to process signals, e.g. data, speech or information signals. To wirelessly communicate the processed signals to a distant communication device (not shown) via an antenna 5 the transceiver 2 is used. The transceiver 2 comprises a transmitting path 21 and a receiving path 22.

The transmitting path 21 and the receiving path 22 are the physical media for signal transmissions over which the signal propagates. The transmitting path 21 and the receiving path 22 are the signal paths for the signals, especially the signal transmission lines. Additional components in the specific path 21, 22, such as amplifier means or matching means for adapting the signals parameters for transmission or receiving of the signals are not excluded.

The transmitting path 21 and the receiving path 22 comprise a common node on which a combiner 7 is arranged in order to avoid that transmitting path signals are directly coupled into the receiving path 22. The combiner 7 can be a power divider device, such as power splitters or in reverse usage a power combiner, or a directional coupler. Those devices are passive devices used in the field of radio technology. They couple a defined amount of the electromagnetic power in a transmission line to a port enabling the signal to be used in another part of the circuit. An essential feature of directional couplers is that they only couple power flowing in one direction. Power entering the output port is coupled to the isolated port but not to the coupled port.

Directional couplers 7 are most frequently constructed from two coupled transmission lines set close enough together such that energy passing through one is coupled to the other. This technique is favored at the microwave frequencies the devices are commonly employed with. However, lumped component devices are also possible at lower frequencies. Also at microwave frequencies, particularly the higher bands, waveguide designs can be used. Many of these waveguide couplers correspond to one of the conducting transmission line designs, but there are also types that are unique to waveguide. It is herewith avoided to show a combiner 7 in greater details.

During transmission of a signal from the signal processing unit 6 to the antenna 5 via the transmitting path 21 it is possible that those transmitted signals are coupled into the receiving path 22 of the transceiver 2. In case a coupling of those unwanted signals to the receiving path 22 occurs, no full duplex mode of the transceiver 2 is possible. Thus, a coupling of transmission signals in the receiving path 22 has to be avoided very strictly.

According to the invention an interference reduction circuit 4 is arranged in between the transmitting path 21 and the receiving path 22. The first node of the interference reduction means 4 is arranged in between the transmitting path 21 and the antenna 5. The second node of the interference reduction means 4 is respectively arranged in between the receiving path 22 and the antenna 5.

The interference reduction means 4 is a wideband interference reduction means 4 and converts the transmitting signal of the transmitting path 21 into an anti-phased signal and provides it to the receiving path 22. As a result an interference signal from the transmitting path 21 to the receiving path 22 is compensated.

Especially the attenuation of the interference reduction means 4 is equal to the radio frequency antenna isolation. Furthermore the propagation delay of the interference reduction means 4 is equal to the propagation delay between the transmitting path 21 and the receiving path 22. Thus, a phase-corrected subtraction of interference signals can be achieved in time domain.

Figure 1B:
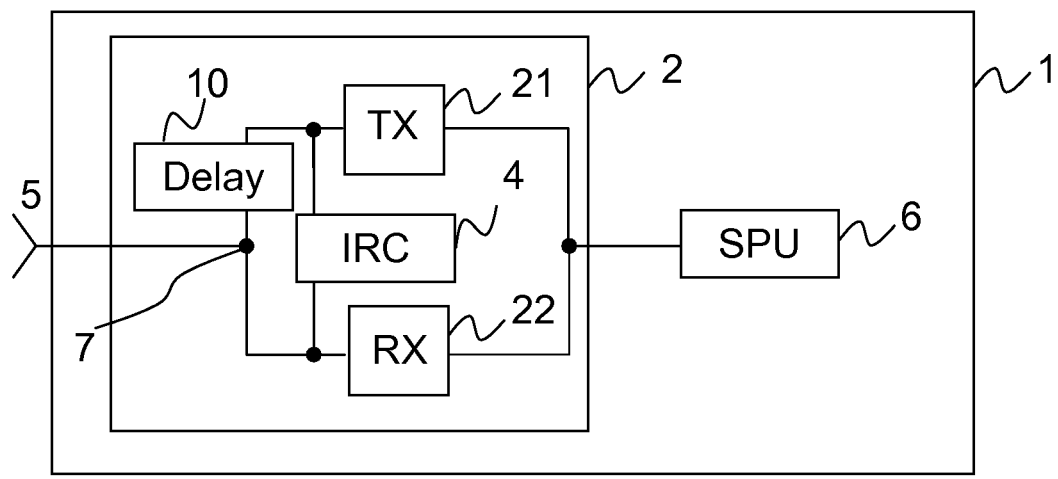
FIG. 1b shows a second exemplary embodiment of a communication device according to the invention.

In FIG. 1b a second exemplary embodiment of a communication device according to the invention is shown. In the following, only the differences between the first exemplary embodiment and the second exemplary embodiment are described. In the transmitting path 21 of the transceiver 2 a delay element 10 is inserted.

The propagation time of a signal which is wirelessly transmitted, for instance over the air, is different to the propagation time of a wired transmission of the signal. To obtain a 180 degree phase match it is therefore necessary to eliminate the difference in the propagation times. Thus, the delay element 10 is inserted into the transmission path 21 in order to align the propagation times.

Figure 2A:
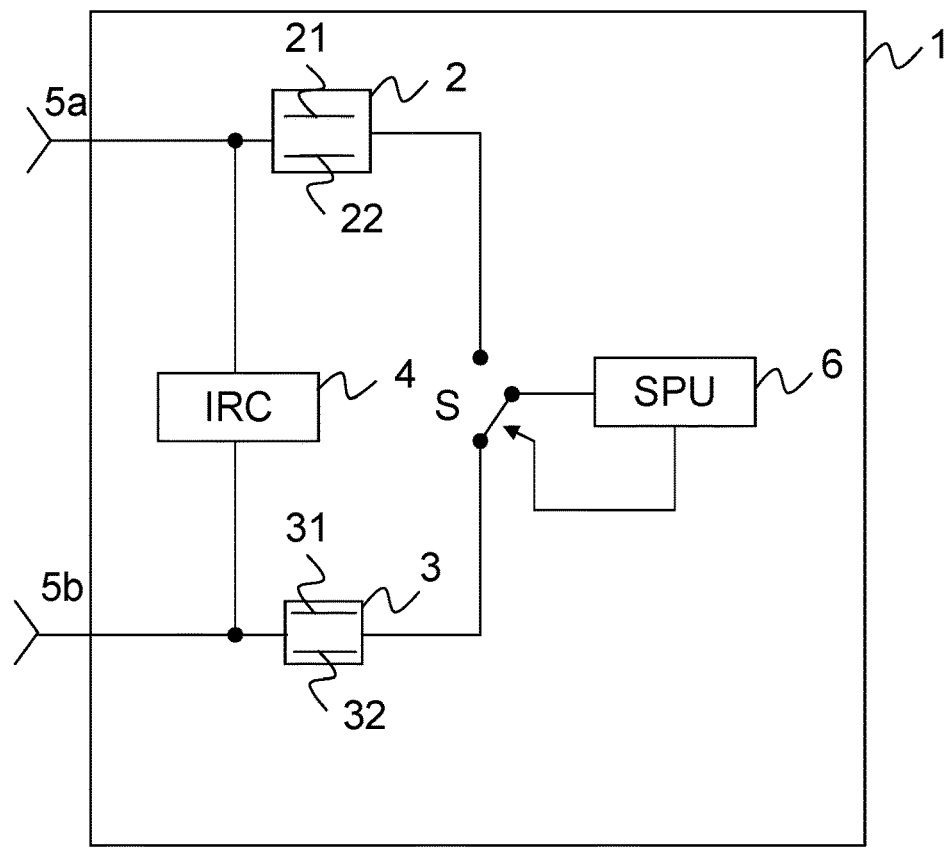
FIG. 2a shows a third exemplary embodiment of a communication device according to the invention.

In FIG. 2a a third exemplary embodiment of a communication device according to the invention is shown. The communication device 1 of FIG. 2 comprises a first transceiver 2 and a second transceiver 3 which are each connected to the signal processing unit 6. A first antenna 5a is connected to the first transceiver 2. A second antenna 5b is connected to the second transceiver 3. The first transceiver 2 transmits and receives signals according to an LTE standard or a similar WWAN communication protocol. The second transceiver 3 transmits and receives signals according to a WLAN standard or another short-range communication standard, such as Bluetooth®, near-field-communication or radio-frequency identification. The signal processing unit 6 is configured to switch between the different transceivers 2, 3 using a switch S.

The first transceiver 2 comprises a transmitting path 21 and a receiving path 22 as shown in FIG. 1a or FIG. 1b. The second transceiver 3 also comprises a transmitting path 31 and a receiving path 32 as shown in FIG. 1a or FIG. 1b. An interference reduction means 4 is arranged in between the first transceiver 2 and the second transceiver 3. Especially during transmission of signals via the transmitting path 21 of the transceiver 2 unwanted interfering signals are coupled in a receiving path 32 of the second transceiver 3. Thus, the second antenna 5b might be blocked or is at least weakened in receiving information or signals via the transceiver 3. Thus, the functionality of the communication device 1 is heavily reduced. To avoid such a reduction in functionality an interference reduction means 4 is inserted. Thus a wideband and anti-phased coupling of the interfering signals to the receiving path 32 of the second transceiver 3 is obtained and the interfering signal is compensated.

Figure 2B:
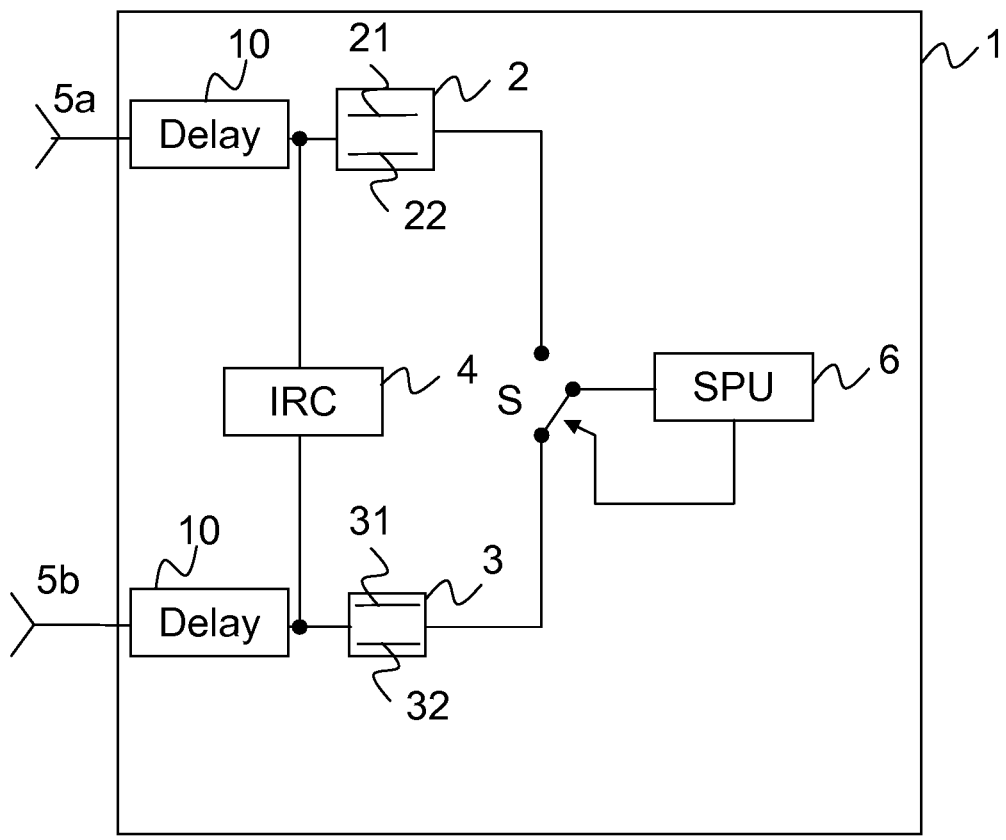
FIG. 2b shows a fourth exemplary embodiment of a communication device according to the invention.

In FIG. 2b a fourth exemplary embodiment of a communication device according to the invention is shown. In the following, only the differences between the third exemplary embodiment and the fourth exemplary embodiment are described. Between the first transceiver 2 and the first antenna 5a a delay element 10 is inserted. Between the second transceiver 3 and the second antenna 5b another delay element 10 is inserted.

The propagation time of a signal which is wirelessly transmitted, for instance over the air, differs from the propagation time of a wired transmission of the signal. To obtain a 180 degree phase match it is therefore necessary to eliminate the difference in the propagation times. Thus, the delay elements 10 are inserted between the transceivers 2, 3 and the antennas 5a, 5b in order to align the propagation times. The delay elements 10 in FIG. 2b are included in the respective first transmission path 21 and the second transmission path 31.

Figure 3:
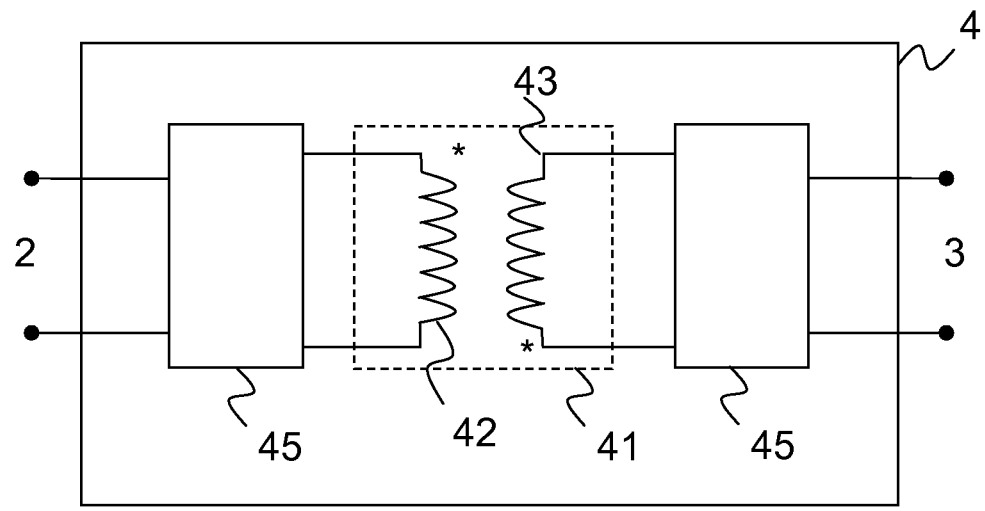
FIG. 3 shows a first exemplary embodiment of an interference reduction means according to the invention.

In FIG. 3 a first exemplary embodiment of an interference reduction means 4 is shown. Therein a transformer 41 is shown comprising a first winding 42 and a second winding 43. The winding direction of the first winding 42 is opposite to the winding direction of the second winding 43. The opposite winding direction leads a 180 degree phase shift of the signal without additional phase shifting means.

The transformer 41 is an electrical device that transfers the transmitting signal from the transmitting path 21 to the receiving path through electromagnetic induction. A varying current in the transformer's first winding 42 creates a varying magnetic flux and a varying magnetic field impinging on the second winding 43. This varying magnetic field at the secondary induces a varying electromotive force or voltage in the second winding 43. The transformer 41 according to the invention has a size of less than a cubic centimeter in volume.

An ideal transformer 41 is a theoretical, linear transformer that is lossless and perfectly coupled; that is, there are no energy losses and flux is completely confined within the magnetic core. Perfect coupling implies infinitely high core magnetic permeability and winding inductances and zero net magnetomotive force. In case the transformer 41 is at least nearly ideal it comprises less attenuation losses. Thus, an attenuation adjustment can be achieved with attenuation means 45 in order to adjust the amplitude of the anti-phased signal for an ideal compensation of the interfered signal.

The ideal transformer model neglects the following basic linear aspects in real transformers. Core losses, collectively called magnetizing current losses, consist of hysteresis losses due to nonlinear application of the voltage applied in the transformer core, and eddy current losses due to joule heating in the core that are proportional to the square of the transformer's applied voltage.

Whereas windings 42, 43 in the ideal model have no resistances and infinite inductances, the windings 42, 43 in a real transformer have finite non-zero resistances and inductances associated with Joule losses due to resistance in the first winding 42 and second winding 43 and leakage flux that escapes from the core and passes through one winding only resulting in primary and secondary reactive impedance. In consideration of a real transformer 41, the attenuation adjustment means 45 might be avoided, if such losses are forced on purpose which reduces components and manufacturing costs. Additionally a frequency adjustment can be achieved using frequency adjusting means 47.

Figure 4:
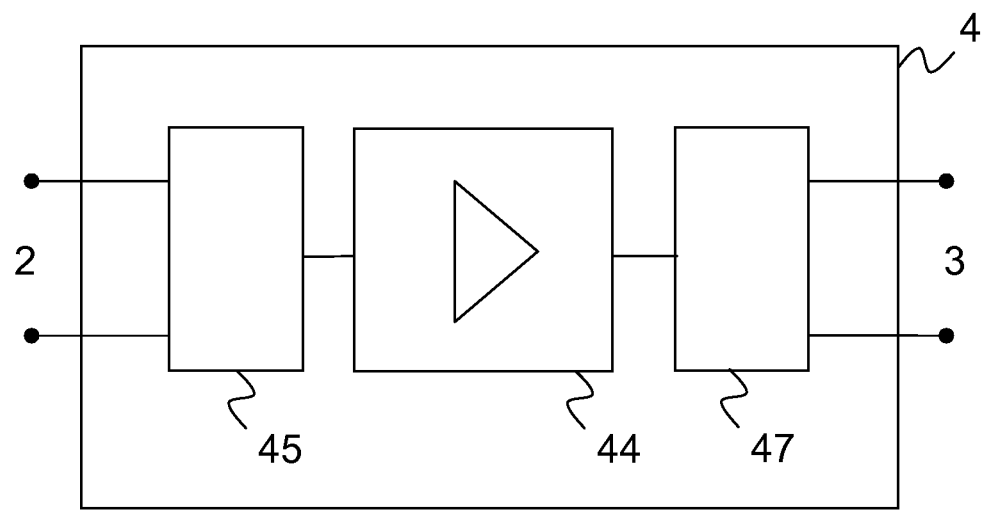
FIG. 4 shows a second exemplary embodiment of an interference reduction means according to the invention.

In FIG. 4 a second exemplary embodiment of an interference reduction means 4 is shown. Therein the phase inversion is obtained by a 180 degree phase inverter which might be built by an inverting operational amplifier. Alternatively or additionally the attenuation of the interference reduction means 4 can be adjusted using an attenuation means 45. Additionally a frequency adjustment can be achieved using frequency adjusting means 47.

Figure 5:
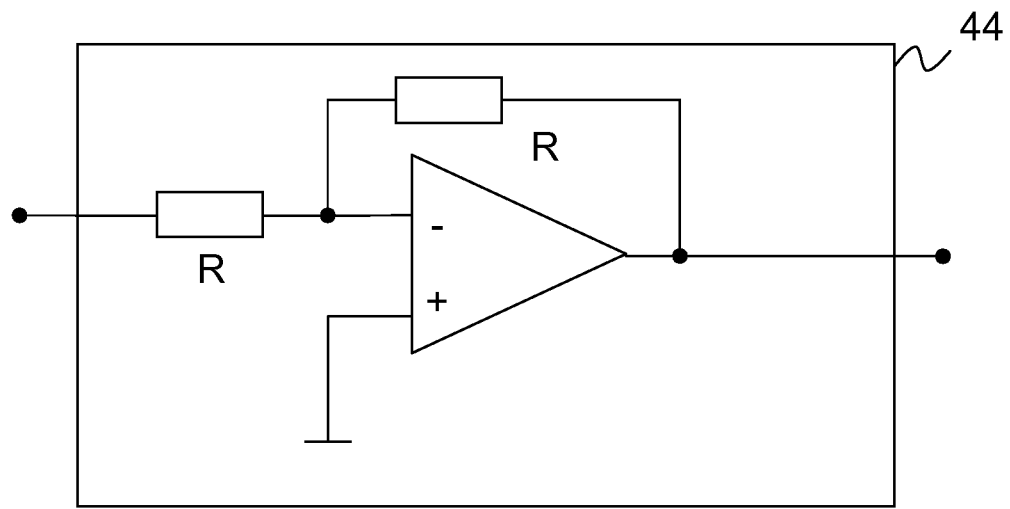
FIG. 5 shows an exemplary embodiment of a phase inverting amplifier according to the invention.

In FIG. 5 an exemplary embodiment of an inverting amplifier 44 is shown. The inverting amplifier 44 is built by an operational amplifier, short OP, comprising a negative input port and a positive input port. Using a resistance element R in the feedback circuit from the output port of the OP to the negative input port of the OP the transmitted signal can be converted with 180 degree to the receiving path 22, 32. In case the resistance elements R are equally valued, the amplification of the OP comprises a value of 1. In case an attenuation should be adjusted on purpose, the resistance element R in the feedback circuit needs to be lower dimensioned than the resistance element at the negative input port of the OP.

Figure 6:
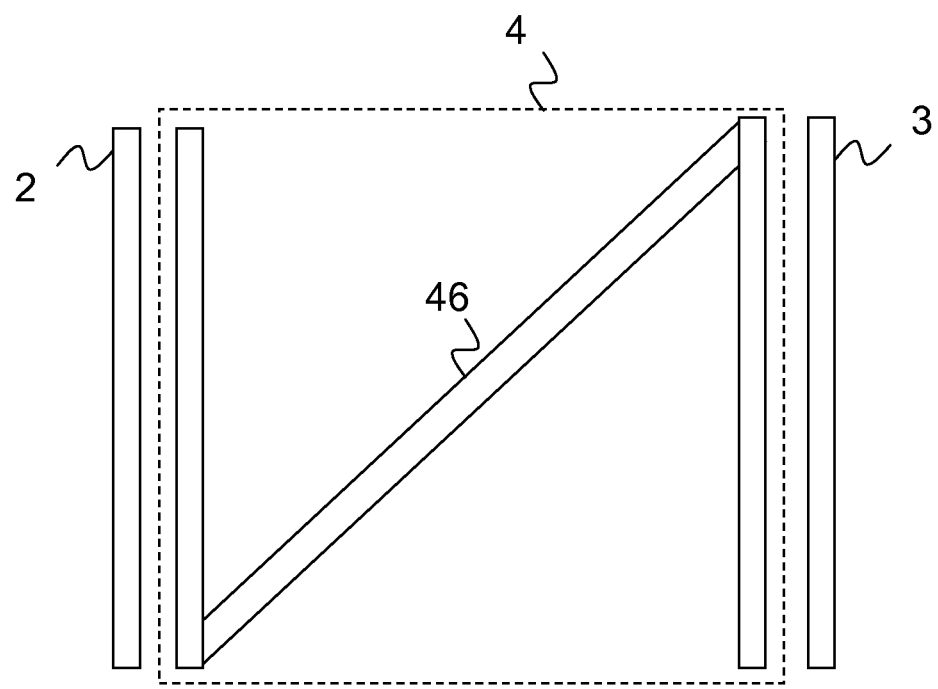
FIG. 6 shows a third exemplary embodiment of an interference reduction means according to the invention.

Further referring to FIG. 6 a third exemplary embodiment of the inventive interference reduction means 4 is shown. Herein the interference reduction means 4 is built as a micro strip arrangement 46.

The micro strip arrangement 46 is a type of electrical transmission line which can be fabricated using printed circuit board technology, and is used to convey microwave-frequency signals. It consists of a conducting strip separated from a ground plane by a dielectric layer known as the substrate. Microwave components such as antennas, couplers, filters, power dividers etc. can be formed from micro strip arrangements, the entire device existing as the pattern of metallization on the substrate. Micro strip arrangement 46 is thus much less expensive than a traditional waveguide technology, as well as being far lighter and more compact.

To reduce costs, the micro strip arrangements 46 may be built on a standard PCB substrate, such as FR-4. However it is often found that the dielectric losses in FR4 are too high at microwave frequencies, and that the dielectric constant is not sufficiently tightly controlled. For these reasons, an alumina substrate is commonly used. On a smaller scale, micro strip transmission lines are also built into monolithic microwave integrated circuits.

The micro strip arrangement 46 is built as a 180 degree phase inverter in order to generate an anti-phased signal for the receiving path 32. Such a micro strip arrangement 46 has the advantage that the antenna 5 and the transmitting path 21, 31 as well as the receiving path 22, 32 can be build on a same substrate without additional manufacturing costs. A simple adjustment of the antenna 5 and the transmitting path 21 and receiving path 22 by insertion of the interference reduction means 46 leads to an easy manufacturing of the interference reduction means 46.

Figure 7:
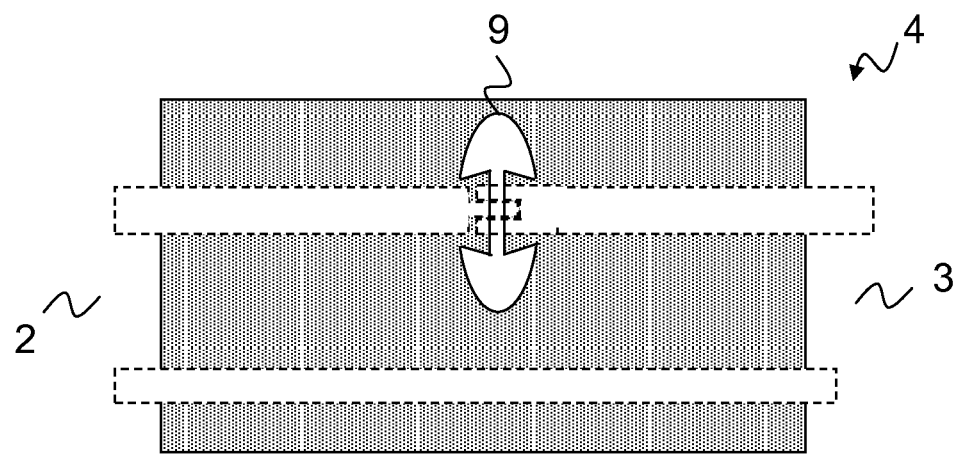
FIG. 7 shows a fourth exemplary embodiment of the interference reduction means according to the invention.

In FIG. 7 a fourth exemplary embodiment of a micro strip arrangement 46 is shown, wherein a defected ground structure 9, short DGS, is arranged in the transmitting path 21, 31 of the interference reduction means 4 on the opposite side of the substrate. Since a phase inverter is a device that changes the phase of a signal by 180 degrees the geometry in FIG. 7 proposes a micro strip. Two radial short end slots in the ground are used to design the DGS. The transmission line (shown in dotted lines) is two parted above the DGS middle bar. Such a modified version of a conventional transmission line has the advantage of a wider bandwidth in which the 180 degree phase shift occurs.

Figure 8:
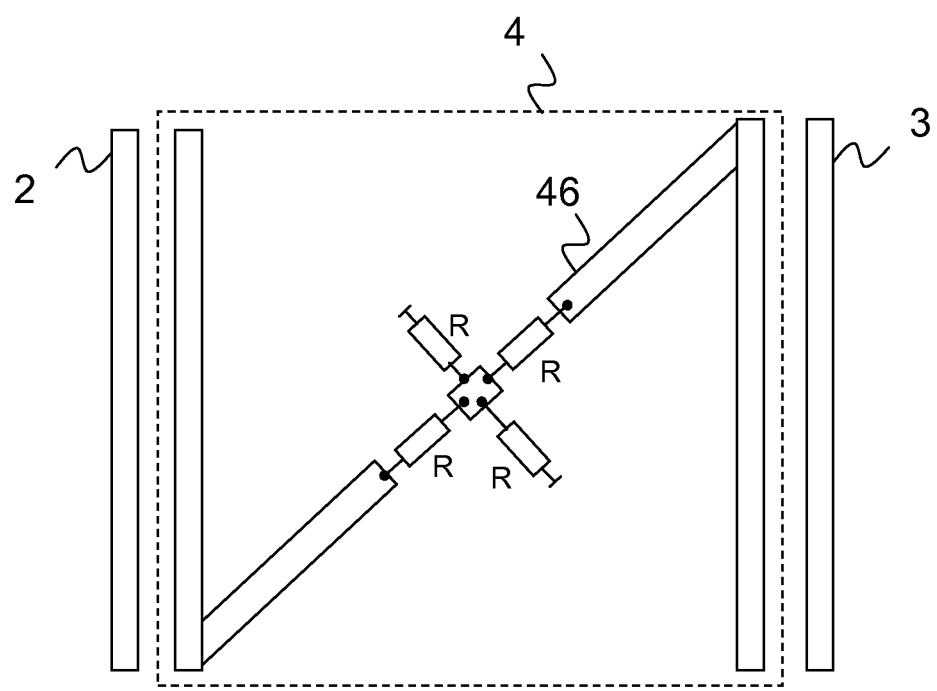
FIG. 8 shows a fifth exemplary embodiment of the interference reduction means according to the invention.

In FIG. 8 a fifth exemplary embodiment of a micro strip arrangement 46 for phase inversion of 180 degree is shown. Therein an attenuation network consisting of resistance elements R is shown. The micro strip arrangement 46 is build by a transmission line which is interrupted with two series resistors R which are connected to a pad in the middle of the transmission line. Additionally to resistors R are placed on each side of the transmission line 46 and are connected to ground. Such an arrangement has the advantage that the attenuation of the micro strip arrangement 46 can be adjusted using resistance R.

Figure 9:
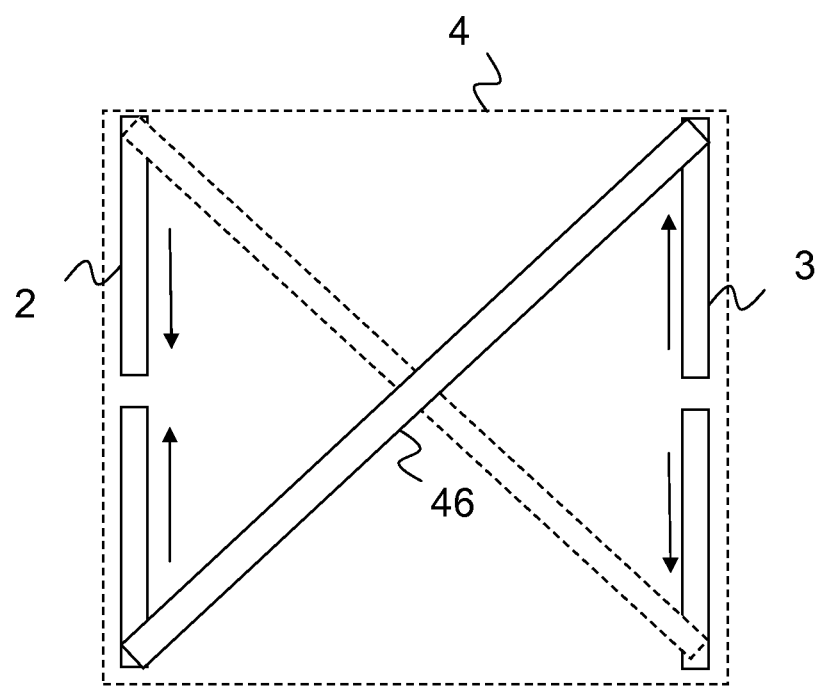
FIG. 9 shows a sixth exemplary embodiment of the interference reduction means according to the invention.

In FIG. 9 sixth exemplary embodiment of a micro strip arrangement 46 for phase inversion of 180 degree is shown. Therein the transmission lines for the transceiver 2 and the transceiver 3 are two-parted. The signals transferred over the transmission lines are crossed to the respective other transmission line. To avoid a short cut in the transmission lines, the transmission line of the first transceiver 2 is placed on a first surface of the substrate wherein the transmission line of the second transceiver 3 is arranged on an opposite surface of the substrate.

Between the two parallel transmission lines, the upper line includes a first crossing signal line through which signals are passed, and the lower transmission line includes a second crossing signal line through which signals is passed. A current flowing along the crossing signal lines is transmitted. Therefore, since currents are passed in a reverse direction, the phase of the signal is inverted by 180 degrees.

The interference reduction means 4 can be used for communication devices such as smart phones or other mobile communication devices and can further be used for collocation of transmitting and receiving arrangements which are arranged in a fixed manner compared to their wavelength, for instance short wave radio frequency or radios for ships.

The invention can be applied to full duplex mode transmissions, such as frequency division domain duplex or communication using one common antenna 5 for the receiving part 22, 32 and the transmitting part 21, as well as using different antennas for receiving and sending of transmission signals.

A compensation of the transmitting signal is achieved using a propagation delay and amplitude compensated anti-phased signal to the receiving path. The compensation is made in the time domain and is frequency independent.

The inventive compensation can also be applied to radio systems comprising a single transmitting path with a dedicated first antenna and a single receiving path with a dedicated second antenna, wherein the first antenna is spatially separated from the second antenna. Those radio systems are for instance installed on ships, wherein the spatial distance between the first antenna and the second antenna comprises several meters, for instance 10 meters. Those radio systems are for instance coastal radio systems, wherein the spatial distance between the first antenna and the second antenna comprises several kilometers, for instance 10 kilometers. In such radio systems an exact propagation time adjustment with the said delay elements is necessary.

All features of all embodiments described, shown and/or claimed herein can be combined with each.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What I claim is:

1. A communication device for wireless signal transmission,
   wherein an interference reduction means is arranged in-between a transmitting path and a receiving path,
   wherein a first node of the interference reduction means is configured to, at least one of:
      be directly connected to both the transmitting path and a transmitting antenna, or
      provide the same signal from the transmitting path to the transmitting antenna,
   wherein a second node of the interference reduction means is configured to, at least one of:
      be directly connected to both the receiving path and a receiving antenna, or
      provide the same signal from the receiving antenna to the receiving path,
   wherein the interference reduction means is a wideband interference reduction means, capable of working bidirectionally, which converts a signal from the transmitting path into an anti-phased signal to provide the anti-phased signal to the receiving path,
   wherein the communication device comprises a plurality of transceivers in a housing of the communication device,
   wherein the transmitting path is a transmitting path of a first transceiver of the plurality of transceivers and the receiving path is a receiving path of a second transceiver of the plurality of transceivers, and
   wherein the transmitting path is also a transmitting path of the second transceiver and the receiving path is also a receiving path of the first transceiver.

2. The communication device according to claim 1, wherein the transmitting path and the receiving path are coupled to a common antenna for a wireless signal transmission to external devices, the common antenna functioning as the transmitting antenna and the receiving antenna.

3. The communication device according to claim 1, wherein an antenna of the first transceiver is arranged in spatial proximity to a corresponding antenna of the second transceiver.

4. The communication device according to claim 1, wherein the interference reduction means comprises an attenuation module.

5. The communication device according to claim 1, wherein a propagation delay of the interference reduction means is equal to a propagation delay between the transmitting path and the receiving path.

6. The communication device according to claim 1, wherein the interference reduction means comprises a transformer, wherein a winding direction of a first winding is opposite to a winding direction of a second winding.

7. The communication device according to claim 1, wherein the interference reduction means comprises at least an inverting amplifier means.

8. The communication device according to claim 1, wherein the interference reduction means comprises a micro strip arrangement.

9. The communication device according to claim 8, wherein the micro strip arrangement comprises resistance elements.

10. The communication device according to claim 8, wherein the micro strip arrangement comprises a defected ground structure.

11. The communication device according to claim 8, wherein the micro strip arrangement comprises one of a Z-structure or a double-Z-structure.

12. The communication device according to claim 1, wherein the interference reduction means comprises a frequency adjusting means.

13. The communication device according to claim 1, wherein a combining element is used to combine the transmitting path and the receiving path.

14. A method for wireless signal transmission with a communication device, the method comprises the steps of:
providing a signal to a transmitting path of the communication device;
converting the signal into an anti-phased signal by an interference reduction means, wherein the interference reduction means is a wideband interference reduction means capable of working bidirectionally, and wherein a first node of the interference reduction means is configured to, at least one of:
be directly connected to both the transmitting path and a transmitting antenna, or
provide the same signal from the transmitting path to the transmitting antenna; and
providing the anti-phased signal to a receiving path of the communication device, wherein a second node of the interference reduction means is configured to, at least one of:
be directly connected to the receiving path and a receiving antenna, or
provide the same signal from the receiving antenna to the receiving path,
wherein the signal is provided by a first transceiver of the communication device,
wherein the transmitting path is part of the first transceiver, and
wherein the receiving path is part of a second transceiver arranged in the communication device.

15. The method according to claim 14, wherein the communication device is a communication device for wireless signal transmission, wherein:
the interference reduction means is arranged in-between the transmitting path and the receiving path; and
the interference reduction means converts the signal from the transmitting path into the anti-phased signal to provide the anti-phased signal to the receiving path.

16. The method according to claim 14, further comprising combining the transmitting path and the receiving path.

17. A communication device for wireless signal transmission comprising
a plurality of transceivers located within a housing of the communication device, transmitters of the plurality of transceivers share a transmitting path, receivers of the plurality of transceivers share a receiving path;
an interference reduction means coupled to the transmitting path and the receiving path, the interference reduction means being a wideband interference reduction means capable of working bidirectionally and configured to passively convert a signal from the transmitting path into an anti-phased signal applied to the receiving path,
wherein a first node of the interference reduction means is configured to, at least one of:
be directly connected to both the transmitting path and a transmitting antenna, or
provide the same signal from the transmitting path to the transmitting antenna, and
wherein a second node of the interference reduction means is configured to, at least one of:
be directly connected to both the receiving path and a receiving antenna, or
provide the same signal from the receiving antenna to the receiving path.

18. The communication device according to claim 17, wherein the anti-phased signal is a static signal.

* * * * *